United States Patent [19]

Kaneko

[11] Patent Number: 5,164,927
[45] Date of Patent: Nov. 17, 1992

[54] COMPACT RECORD PLAYER HAVING DOWNWARDLY EXTENDING NOTCHED RIB AND MULTIPLE SELECTION LEVERS

[75] Inventor: Masumi Kaneko, Yokohama, Japan

[73] Assignee: Ozen Corporation, Tokyo, Japan

[21] Appl. No.: 655,655

[22] Filed: Feb. 14, 1991

[30] Foreign Application Priority Data

Feb. 15, 1990 [JP] Japan .................... 2-34808

[51] Int. Cl.⁵ .................. G11B 17/22; G11B 31/00; G11B 23/00; A63H 3/33
[52] U.S. Cl. ........................ 369/31; 369/63; 369/258
[58] Field of Search ............ 369/258, 31, 63, 65, 369/66, 67

[56] References Cited

U.S. PATENT DOCUMENTS

| | | | |
|---|---|---|---|
| 4,404,668 | 9/1983 | Watanabe | 369/65 |
| 4,482,990 | 10/1984 | Koike | 369/31 X |
| 4,541,085 | 9/1985 | Koike | 369/65 |
| 4,680,747 | 7/1987 | Blake, III | 369/31 X |
| 4,811,322 | 3/1989 | Koike et al. | 369/67 X |
| 4,876,678 | 10/1989 | Koike et al. | 369/31 |

Primary Examiner—John W. Shepperd
Assistant Examiner—Michael C. Kessell
Attorney, Agent, or Firm—Weintraub, DuRoss & Brady

[57] ABSTRACT

A disk record sound reproducing apparatus includes a turntable having a cylindrical rib formed on the lower surface thereof and protruding downwardly therefrom. A plurality of selection levers, equal in number to a number of modulated grooves of a disk record, are pivotably disposed below the turntable, the levers being arranged radially with respect to the center of the turntable. Each selection lever has a drawn-down arm and a holding arm which are respectively engageable with a part of the turntable and the lower edge of the rib. When one of the selection levers is turned, the turntable is lowered by the draw-down arm which presses down the part of the turntable, and at the same time, the holding arm rides over the lower edge of the rib and enters the inside of the rib. Thus, the turntable together with the record disk is maintained at its lowered position, and the application of stylus force to the disk record is released. With rotation of the turntable, when a cutout notch of the rib reaches the position of the holding arm, the holding arm is allowed to pass through the cutout notch, thereby to return the selection lever.

1 Claim, 5 Drawing Sheets

COMPACT RECORD PLAYER HAVING DOWNWARDLY EXTENDING NOTCHED RIB AND MULTIPLE SELECTION LEVERS

BACKGROUND OF THE INVENTION

1. Field of the Invention

The present invention relates to a disc record sound reproducing apparatus for reproducing a sound by selecting a desired modulated groove from a plurality of modulated grooves formed in the disk record.

2. Prior Art

A prior art disk record sound reproducing apparatus for reproducing a sound by selecting a modulated groove is disclosed, for example, in Japanese Patent Laid-Open Publication No. 64-14701.

In this apparatus, a flange is formed on a periphery of a disk record having a plurality of modulated grooves, and an index portion is formed by cutting out an arbitrary point of the flange. Furthermore, a stylus force releasing operating wheel of a cylindrical shape is disposed surrounding the disk record, and at the same time, a lateral side surface of the stylus force releasing operating wheel is cut out to form an inclined surface, and the stylus force releasing operating wheel is formed with a stylus force releasing bar at a position adjacent to a sound transmitting body which is coupled to a pickup. Furthermore, a plurality of selection bars are disposed at predetermined intervals so that the selection bars are biased downwardly to come adjacent to the stylus force releasing operating wheel and the selection bars move up and down. Each of the selection bars is formed with a coupling member which is elastically deformed and rides on the flange, and is formed with a pressing portion for pressing the slant surface of the stylus force releasing operating wheel.

Accordingly, in the prior art apparatus, by advancing the selection bar by pressing it, the pressing portion of the selection bar presses the slant surface of the stylus force releasing operating wheel to rotate the operating wheel, and the stylus force releasing bar moves the sound transmitting body upwardly, thereby releasing the stylus force. At the same time, the coupling member of the selection bar rides on the flange and the stylus force released condition is maintained. When the disk record rotates and the index portion of the flange reaches the coupling member, the coupling member passes through the index portion, and the selection bar retards due to the biasing of a spring. As a result, the stylus force releasing operating wheel and the stylus force releasing bar return to the original positions, and the stylus force is applied to the disk record to reproduce a sound from the disk record.

Because the timing of releasing the stylus force is determined by a relative position between the index portion of the flange and the selection bar, one of the modulated grooves to be reproduced is decided depending on which of the selection bars is operated.

However, in the prior art apparatus described above, since the release of the stylus force and the application of the stylus force are achieved by using a plurality of movable parts such as the selection bars, stylus force releasing operating wheel, etc., a problem is involved in which the number of operating parts is increased, and thus, the high durability cannot be easily maintained. Furthermore, since the return springs and the like must be provided, to respectively return the movable parts to predetermined positions, a problem is involved in which the structure is complicated and many hours of labor are needed for the manufacturing and assembling of the parts, and the manufacturing efficiency is not satisfactory.

SUMMARY OF THE INVENTION

It is an object of the present invention to provide a disk record sound reproducing apparatus in which the number of movable parts is reduced, by performing the release of the stylus force and the application of the stylus force by a simple structure, and further in which the durability is excellent and the manufacturing efficiency is satisfactory.

In accordance with the present invention, a disk record sound reproducing apparatus is provided, comprising:

a disk record having starting ends of modulated grooves distributed along a periphery of the disk record, a single pickup for scanning a selected one of the modulated grooves, and a turntable for positioning the disk record at a high sound reproducing position at which the disk record abuts against the pickup for rotating the disk record unitary with the turntable.

The improvement of the present invention, in a preferred embodiment, comprises a rib formed on a lower surface of the turntable extending downwardly in a direction parallel to a rotating shaft and concentrically with the turntable, the rib having a cutout notch formed therein;

a plurality of selection levers disposed radially with respect to a center of the turntable and respectively pivotably supported at intermediate portions thereof, a number of the plurality of selection levers being equal to a number of the modulated grooves, each of the selection levers having a draw-down arm which abuts against a part of the turntable to draw the turntable downwardly and having a holding arm which extends in a direction crossing the draw-down arm and which abuts against an edge of the rib and rides over the edge from an outside to an inside when an extreme end of the arm turns; and an elastic member coupled with the turntable to bias the turntable upwardly.

In the sound reproducing apparatus structured as described above, when an arbitrary selection lever among the plurality of selection levers is turned, the draw-down arm draws down the turntable against the biasing of the elastic member, and the disk record is drawn down from the high sound reproducing position and releases the stylus force of the pickup. On the other hand, with the operation of the draw-down arm, the holding arm of the selection lever abuts against the edge of the rib of the turntable and rides over the edge to enter the inside of the rib. Under this condition, even when the draw-down arm is pressed to move the turntable upwardly due to the biasing of the elastic member, the holding arm which is integral with the draw-down arm abuts against the inner side of the rib and the turning of the selection lever is prevented, and the turntable is maintained in a lowered condition.

Next, under this condition, when the turntable and the disk record are rotated and the cutout notch formed in the rib reaches the selection lever which has been operated, the holding arm of the selection lever passes through the cutout notch and goes to the outside of the rib, and the selection lever is permitted to turn. Thus, the turntable which is released from the fixed condition is moved upwardly by the biasing of the elastic member, and the disk record returns to the high sound reproducing position and the stylus force is applied. Then the pickup is brought into engagement with a start end of a modulated groove, and the reproduction of a sound is started from the disk record.

In this case, the timing of the movement of the turntable upwardly is determined by a relative position between the selection lever and the cutout notch, and also the position of the cutout notch and the position of the start end of each modulated groove are in a predetermined relationship. As a result, the particular one of the modulated grooves which is to be played is decided depending on which of the selection levers is operated.

Furthermore, in the sound reproducing apparatus of the present invention, since the above-mentioned operation can be achieved by the selection lever and the rib formed on the turntable, the number of movable parts is reduced and the structure of the apparatus is simplified.

BRIEF DESCRIPTION OF THE PREFERRED EMBODIMENTS

An embodiment of the present invention will be described with references to FIGS. 1-3.

Figure 1:
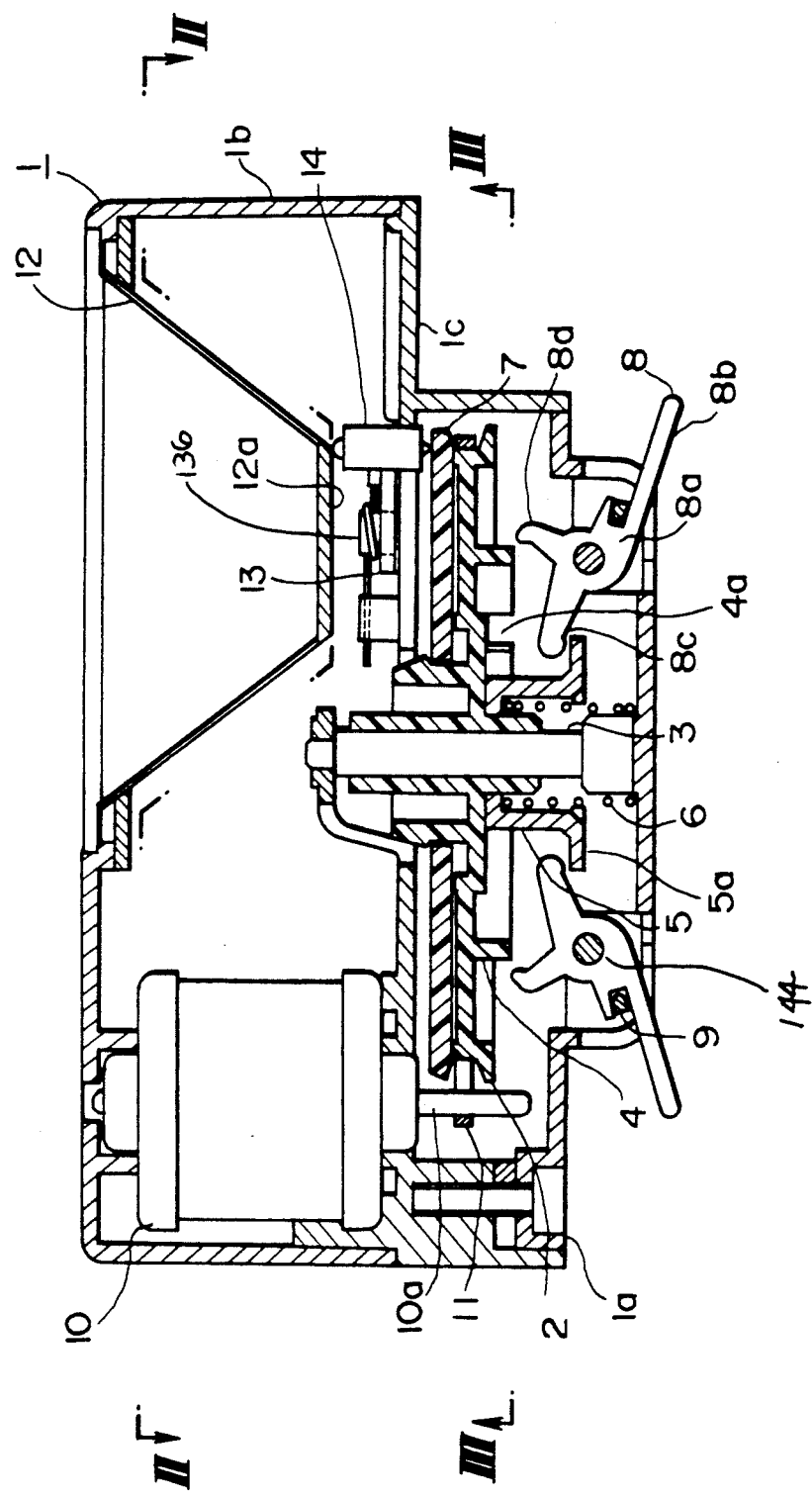
FIG. 1 is a sectional side view of the disk record sound reproducing apparatus of an embodiment of the present invention.

With reference to FIG. 1, a casing 1 of a disk record sound reproducing apparatus is comprised of a lower chassis 1a, an upper housing 1b, and an inner mounting plate 1c interposed between the lower chassis 1a and the upper housing 1b.

A turntable 2, formed of a material having flexibility, for example, a synthetic resin, is disposed between the chassis 1a and the inner mounting plate 1c, and the turntable 2 is fitted about a rotating shaft 3 having an upper end fixed to the inner mounting plate 1c and having a lower end fixed to the chassis 1a. A rib 4 is formed on a lower surface of the turntable 2 so that the rib 4 protrudes downwardly and concentrically in a short hollow cylindrical shape. Furthermore, the rib is formed with a cutout notch 4a at a part of the rib 4. A record disk 7 is fixed to an upper surface of the turntable 2 so that the record disk 7 is rotated unitary with the turntable 2. An annular member 5 is fixed to the lower surface of the turntable 2 inside the rib 4 integrally with the turntable 2. Further, the annular member 5 has a flange 5a at a lower end, and the flange 5a extends outwardly from the annular member 5 so as to be substantially parallel with the turntable 2. A return spring 6 is fitted into the inside of the annular member 5 to bias the annular member 5 and the turntable 2 upwardly, and in a normal condition, the disk record 7 is maintained at a predetermined high position or a high sound reproducing position.

A plurality of selection levers 8 are held by the chassis 1a so that the selection levers 8 are pivotable about their intermediate portions which are held by support points 144 which are formed as part of the chassis 1a. Specifically, as shown in FIG. 3, the selection levers 8 are arranged radially with respect to the center of the rotating shaft 3 at equal angular spaces. Each of the selection levers 8 has a main body 8a pivotably a support point 144 of the chassis 1a, an operating arm 8b extending outwardly from the main body 8a to reach the outside of the chassis 1a, a draw-down arm 8c extending inwardly from the main body 8a to be abuttable against the flange 5a of the annular member 5, and a holding arm 8d extending upwardly from the main body 8a in a direction substantially normal to the draw-down arm 8c. The distance between the end of the draw-down arm 8c and the end of the holding arm 8d is set to be a little larger than a distance between a position at which the draw-down arm 8c abuts against the flange 5a of the annular member 5 and the lower edge of the rib 4. Furthermore, a rubber ring 9 is fitted around the selection levers 8 to collect the plurality of selection levers 8 together.

A motor 10 is disposed within the casing between the upper housing 1b and the inner mounting plate 1c, and its rotating shaft 10a extends below the inner mounting plate 1c. A rubber drive belt 11 engages around both an outer periphery of the turntable 2 and the rotating shaft 10a, so that the turntable 2 is rotated by the motor 10 through the rubber belt 11.

A speaker cone 12 is fixed to the upper housing 1b with an opening of the speaker cone 12 facing upwardly, and a bottom portion 12a of the speaker cone 12 is flat so that the speaker cone 12 has a bowl shape.

Figure 2:
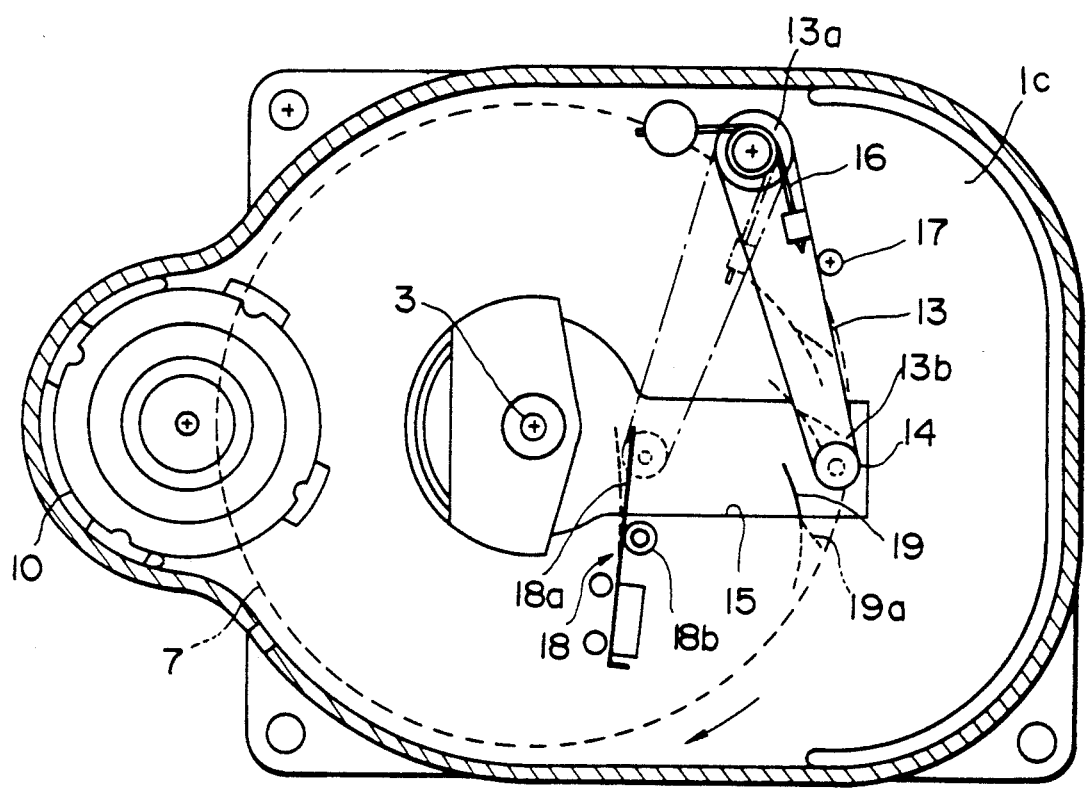
FIG. 2 is a sectional plan view taken along the line II—II in FIG. 1.

As shown in FIGS. 1 and 2, a tone arm 13 is disposed on an upper surface of the inner mounting plate 1c with a base portion 13a of the tone arm 13 being pivotally supported on a pivot pin 136. A pickup 14 is fixed to a swingably movable end 13b of the tone arm 13 opposite the pivot pin 136. An upper portion of the pickup 14 abuts against the flat bottom portion 12a of the speaker cone 12, and a lower end of the pickup 14 abuts against the disk record, the pickup 14 passing through a window 15 which is formed in the inner mounting plate 1c. The pickup 14 is, as shown by the solid line in FIG. 2, in a stylus force released condition, returned to a predetermined position (hereinafter, referred to as a reproduction stand-by position) by a return spring 16. The spring 16 urges the tone arm 13 and the pickup 14 towards the outer periphery of the disk record 7, and the outward motion of the arm 13 is stopped by a positioning pin 17.

A switch 18, for starting and stopping the motor 10, is provided on the upper surface of the inner mounting plate 1c. When the pickup 14 is moved to a predetermined position (hereinafter referred to as a sound reproduction finish position) after finishing the sound reproduction of the disk record 7, the pickup 14 presses a flexible plate 18a of the switch 18 to interrupt the contact with a contact pin 18b thereby to stop the motor 10. The sound reproduction finish position is shown by the broken outline of the arm 13 in FIG. 2.

As shown in FIG. 2, partially, modulated grooves 19, which are equal in number to the selection levers 8 are formed in the upper surface of the disk record 7, and start ends 19a of the modulated grooves 19 are formed along a peripheral edge of the disk record 7 at equal intervals and at constant relative positions with respect to the selection levers 8.

Next, the disk record sound reproducing operation will be described with reference to FIGS. 2 and 4A-4D.

Figure 4A:
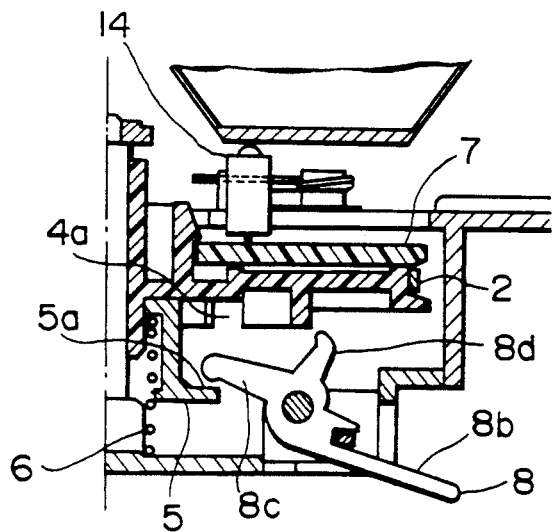
FIGS. 4A-4D are sectional side views for explaining the operation of the selection lever.

FIG. 4A shows a normal condition in which disk record sound reproduction is not performed. Specifically, the pickup 14 which has once finished a sound reproduction of the disk record 7 is moved and positioned at the sound reproduction finish position which is near the center of the disk record 7. The pickup 14 and the tone arm 13 in this condition are at positions shown by the long and short dash line in FIG. 2, and since the pickup 14 opens the switch 18, the motor 10 is stopped and the turntable 2 is not rotating.

Figure 4B:
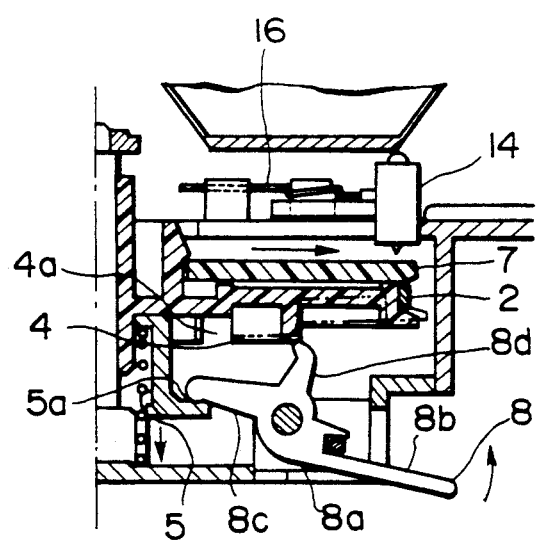

FIG. 4b shows an initial condition after one of the selection levers 8 is operated. First, when the operating arm 8b of the selection lever 8 is pressed upwardly, that is, towards the casing 1, the selection lever 8 is turned with its main body 8a pivoting about the supporting point 144, and the draw-down arm 8c, at the opposite side of the lever 8, is moved downwardly.

Then the draw-down arm 8c abuts against the flange 5a downwardly thereby to draw down the turntable 2 and the disk record 7. When the disk record 7 moves down to a position lower than the high sound reproducing position, the stylus force of the pickup 14 is released, and the pickup 14 returns to the reproduction stand-by position for the disk record 7 due to the biasing by the return spring 16. Furthermore, because of the movement of the pickup 14 from the sound reproduction finish position, the switch 18 is closed and the motor 10 is started to start the rotation of the turntable 2.

On the other hand, the holding arm 8d of the selection lever 8 is turned together with the draw-down arm 8c, in a unitary fashion, and the end of the holding arm 8d is brought into abuttment with the lower edge of the rib 4 which is moving downwardly together with the turntable 2. When the operating arm 8b is pressed further, the turntable 2 is elastically deformed as shown by the long and short dash line in FIG. 4B, and the holding arm 8D rides over or rides across the lower edge of the rib 4 and moves into the inside of the rib 4. This elastic deformation of the turntable 2 is made possible by forming the turntable of a flexible material, as noted.

Figure 4C:
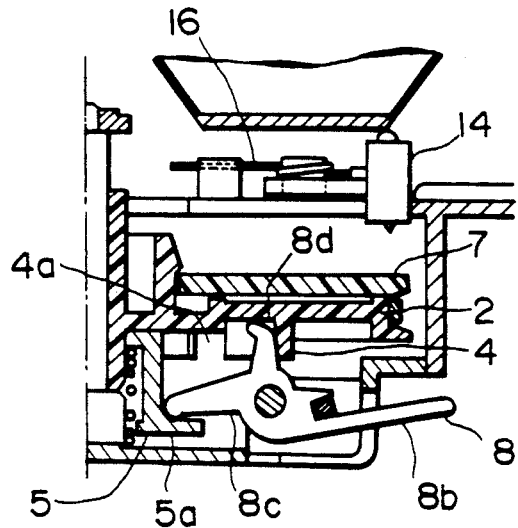

FIG. 4c shows a condition in which the turntable 2 is maintained at its lowered position. In this condition, the draw-down arm 8c and the holding arm 8d of the selection lever 8 are fitted into a space between the flange 5a and the rib 4, and even when the return spring 6 pushes the draw-down arm 8c upwardly by its action in biasing the turntable 2 upwardly, the turning movement of the selection lever 8 is prevented by the holding arm 8d which is abutting against the inner side of the rib 4. As a result, the draw-down arm 8c is secured at the present position and the turntable 2 is maintained at its lowered position. At this time, although the turntable 2 is continuing its rotation, the disk record 7 is not playing a reproduced sound because the pickup 14 and the disk record 7 are spaced apart from each other.

Figure 4D:
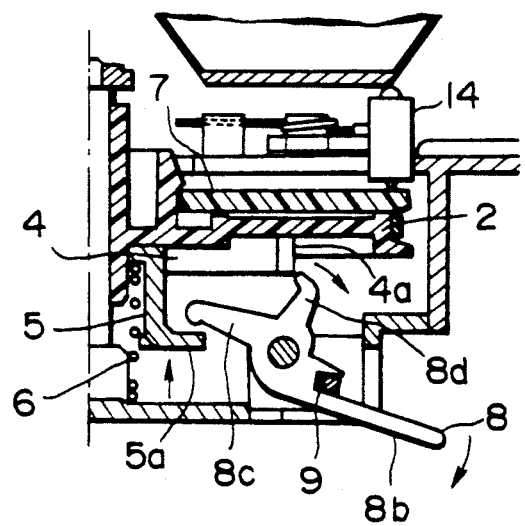

FIG. 4D shows a condition in which the turntable 2 has moved to its up-position and the sound reproducing of the disk record 7 is to be started. Specifically, with the rotation of the turntable 2, when the cutout notch 4a of the rib 4 reaches the position of the operated selection lever 8, the holding arm 8d passes through the cutout notch 4a and goes to the outside of the rib 4. Thus, the selection lever 8 which has been prevented from turning by the holding arm 8d is allowed to turn in the direction of the arrow, and the draw-down arm 8c is also raised due to a biasing force of the rubber ring 9. As a result, the turntable 2 is moved upwardly by being urged by the return spring 6, and when the disk record 7 returns to the high sound reproducing position, a stylus force is applied to the record disk 7.

In this condition, the pickup 14 is brought into engagement with the start end of one of the modulated grooves 19, which reaches the position of the pickup 14 to start sound reproduction, and when the pickup 14 is moved to the sound reproduction finish position, the switch 18 is opened and the rotation of the turntable 2 is stopped, and the pickup 14 returns to the condition shown in FIG. 4A.

Figure 3:
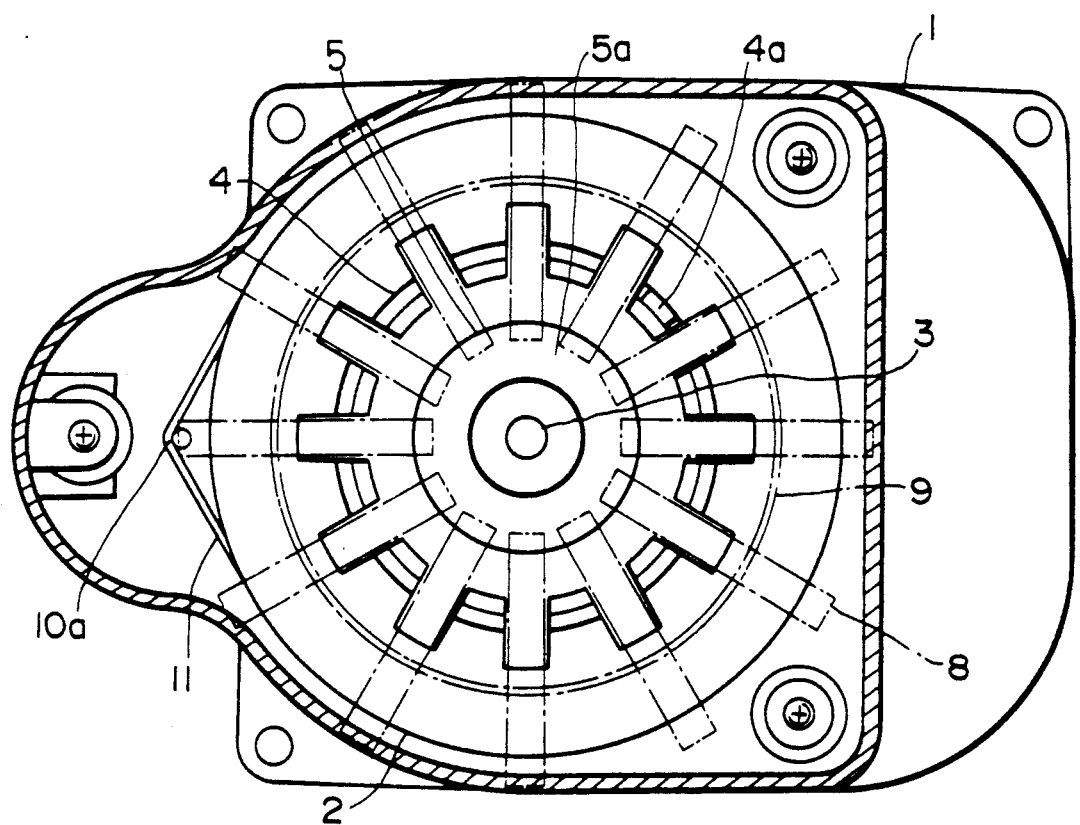
FIG. 3 is a sectional bottom view taken along the line III—III in FIG. 1.

In this case, the timing of moving of the turntable 2 upwardly and starting of the reproduction of the disk record 7 is determined as shown in FIG. 3 by a relative position between the selection lever 8 and the cutout notch 4a of the rib 4. However, since the position of the cutout notch 4a and the position of the start end 19a of each modulated groove 19 are in a predetermined relationship, which one of the modulated grooves 19 to be selected is determined, depending on which of the selection levers 8 is operated.

Accordingly, in the apparatus of the depicted embodiment, a desired one of the modulated grooves 19 can be played to produce a reproduced shound easily and simply by providing the selection levers 8 and the rib 4 having the cutout notch 4a, and further, since the selection levers 8 are disposed within the casing 1 and radially around the turntable 2, an advantage is obtained, in which the apparatus can be formed compactly.

In the apparatus in the depicted embodiment, while the structure is employed in which the holding arm 8d rides over the rib 4 due to the deformation of the turntable 2, it is not necessarily limited to this structure and other structures may be employed in which, for example, the rib 4 itself or the holding arm 8d is deformed, or the flange 5a of the annular member 5 is deformed so that the holding arm 8d can ride over the rib 4.

As described in the foregoing, since the release of the stylus force, and the application of the stylus force are achieved by a small number of movable parts, the durability of the sound reproducing apparatus can be increased. Furthermore, since the structure is simple and the number of parts is reduced, the manufacture and assembling are simple, and the manufacturing efficiency can be improved.

Having, thus, described the invention, what is claimed is:

1. In a disk record sound reproducing apparatus of the type comprising a disk record having starting ends of respective modulated grooves distributed along a periphery of said disk record, a single pickup for scanning a selected one of the modulated grooves of said disk record, and a turntable having an upper surface and a lower surface for positioning said disk record at a sound reproducing position at which said disk record abuts against said pickup, and means for rotating said disk record unitarily with said turntable, said means including a central rotating shaft, the turntable being journalled thereon, the improvement comprising;

a rib formed on the lower surface of said turntable, said rib extending downwardly in a direction parallel to the rotating shaft and concentrically with said turntable, said rib having a cutout notch formed therein forming a radially directed passage in a radial direction;

a plurality of selection levers disposed below said turntable and radially extending with respect to the center of said turntable, each of said selection levers being respectively pivotably supported, the number of said plurality of selection levers being equal to the number of the modulated grooves, each of said selection levers having a draw-down arm which abuts against a part of said turntable to draw said turntable downwardly and each of said levers having a holding arm, which extends in a nonparallel direction with respect to the draw-down arm, and which abuts against said rib and rides over the rib by elastically deforming at least one of said rib and said holding arm when an extreme end of the holding arm turns to thereby hold the turntable at the lower position and to make the pickup return to its upper position and to start rotation of the turntable, and wherein the cutout notch of the rib reaching a position of the operated selection lever due to the rotation of the turntable, permits the holding arm to pass through the cutout notch and thereby to allow the draw-down arm to turn upwardly and to make the turntable move upwardly to the upper sound reproducing position; and means coupled with said turntable to bias said turntable upwardly.

* * * * *